(12) United States Patent
Farrow et al.

(10) Patent No.: US 8,737,065 B2
(45) Date of Patent: May 27, 2014

(54) COMPUTER EQUIPMENT WITH SLIPPERY PADS

(75) Inventors: Timothy Samuel Farrow, Cary, NC (US); Albert Vincent Makley, Morrisville, NC (US); William Fred Martin-Otto, Apex, NC (US); James Edward Hollifield, III, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 113 days.

(21) Appl. No.: 13/430,398

(22) Filed: Mar. 26, 2012

(65) Prior Publication Data

US 2013/0250511 A1    Sep. 26, 2013

(51) Int. Cl.
*G06F 1/16*    (2006.01)

(52) U.S. Cl.
USPC ............. 361/679.59; 361/679.6; 361/724; 312/223.1; 312/223.2

(58) Field of Classification Search
USPC .................................. 361/679.59
See application file for complete search history.

(56) References Cited

U.S. PATENT DOCUMENTS

| | | | | |
|---|---|---|---|---|
| 4,767,105 A | * | 8/1988 | Caspers | 267/140 |
| 4,846,428 A | * | 7/1989 | Johannes | 248/188.8 |
| D364,148 S | * | 11/1995 | Jasinski et al. | D14/349 |
| 5,845,978 A | * | 12/1998 | Jung | 312/244 |
| 5,931,550 A | * | 8/1999 | Chen | 312/244 |
| 6,220,680 B1 | * | 4/2001 | Chen | 312/223.2 |
| D511,163 S | * | 11/2005 | Su et al. | D14/349 |
| 6,979,778 B2 | * | 12/2005 | Xiong et al. | 174/50 |
| 7,697,282 B2 | * | 4/2010 | Jackson et al. | 361/679.59 |
| 8,191,852 B1 | * | 6/2012 | Wheatley | 248/677 |
| 8,199,498 B2 | * | 6/2012 | Wang et al. | 361/679.59 |
| 8,213,177 B2 | * | 7/2012 | Uttermann et al. | 361/679.59 |
| 2003/0179543 A1 | * | 9/2003 | Sri-Jayantha et al. | 361/683 |
| 2008/0251663 A1 | * | 10/2008 | Tracy et al. | 248/188.8 |
| 2009/0175001 A1 | * | 7/2009 | Mathew et al. | 361/679.59 |
| 2012/0243153 A1 | * | 9/2012 | Uttermann et al. | 361/679.01 |

* cited by examiner

*Primary Examiner* — Anthony Q Edwards
(74) *Attorney, Agent, or Firm* — Brian J. Pangrle

(57) ABSTRACT

A computer housing can include a front end and a back end; a back edge; opposing lateral sides; a top side; a base disposed between the front end and the back end and between the opposing lateral sides; and two spherical cap pads attached to the base that define, with respect to the back edge, a maximum tilt angle for downward movement of the back end responsive to upward movement of the front end of the computer housing. Various other apparatuses, systems, methods, etc., are also disclosed.

19 Claims, 8 Drawing Sheets

COMPUTER EQUIPMENT WITH SLIPPERY PADS

TECHNICAL FIELD

Subject matter disclosed herein generally relates to pads for computer equipment.

BACKGROUND

Many computers include feet. For example, a computer with a computer housing may include feet arranged near four corners of a base of the computer housing. Such feet can support the computer a distance from a surface, such as a floor, where the distance may be sufficient for insertion of fingers to grasp the computer (e.g., for lifting the computer to move it).

SUMMARY

A computer housing can include a front end and a back end; a back edge; opposing lateral sides; a top side; a base disposed between the front end and the back end and between the opposing lateral sides; and two spherical cap pads attached to the base that define, with respect to the back edge, a maximum tilt angle for downward movement of the back end responsive to upward movement of the front end of the computer housing. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
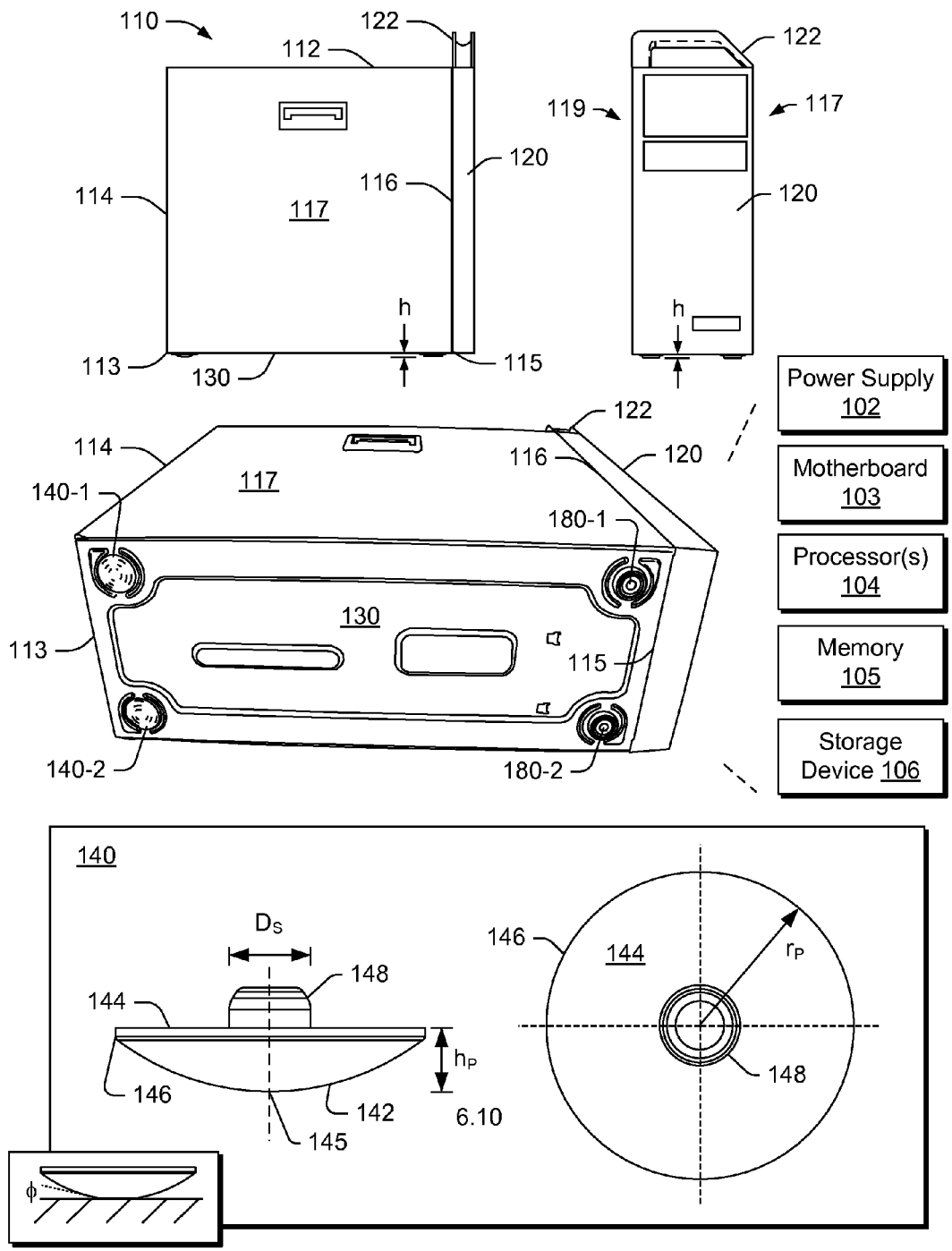
FIG. 1 is a series of views of an example of computer equipment that includes examples of pads and feet.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

A computer with a computer housing may include feet arranged near four corners of a base of the housing. Such feet may support the computer a distance from a surface, such as a floor, where the distance may be sufficient for insertion of a fingers to grasp the computer (e.g., for lifting the computer to move it). However, computers are often placed under tables, desks, within cabinets, etc., for example, for locating closer to power outlets, network connectors, etc., and hiding cable clutter. Such locations may offer little space for reaching with a hand or inserting fingers. Such locations may require pushing or pulling of a computer. Where a computer includes four rubber or "grippy" feet to stand it on a surface, pushing or pulling of the computer must overcome frictional forces between the feet and the surface. The computer may jerk abruptly or hop as the feet release and re-grip the surface, which may subject the computer to vibration, impact, etc. Such a computer may be difficult to position in tight confines where space for inserting a hand is limited. Where access is needed to the computer (e.g., to back end cables, etc.), the computer may require shimmying within tight confines where the shimmying becomes difficult due to gripping, releasing, and re-gripping of the feet on a surface.

As described herein, as an example, a computer may include one or more pads with a low friction surface. For example, a pad may include a surface with a coefficient of friction coefficient or coefficients of friction that may allow for sliding of the pad over a surface without abrupt jerks or hops (e.g., due to gripping, releasing and re-gripping).

One type of coefficient of friction (COF) is the static COF, which applies to objects that are motionless, while another type of COF is the kinetic or sliding COF, which applies to objects that are in motion. When attempting to move an object across a surface, a transition occurs from static to kinetic (actual movement). The amount of force required to achieve a transition can depend on a variety of factors such as characteristics of surfaces as well as mass of an object. Further, after transition, friction induced vibrations or even hops can occur, again, depending on various factors.

As to static and kinetic friction forces, static may exceed kinetic. For example, once static friction force is overcome, it takes less force to move an object over a surface. In some instances, reports indicate that kinetic friction forces may exceed static friction forces. In either instance, during movement of an object over a surface, friction induced vibrations may occur such as, for example, single stick-slip, multiple stick-slip or harmonic oscillations. For computer equipment, avoidance of such vibrations can provide for steady-sliding over a surface, which may be beneficial as to performance, longevity, servicing, etc., of the equipment. Steady-sliding may correspond to a gradual drop in friction for a static-to-kinetic transition or it may correspond to a smooth transition, for example, where static COF and kinetic COF are approximately the same. As an example, where a computer is positioned or to be positioned in tight confines, steady-sliding features may facilitate such positioning (e.g., and avoid a need for shimmying, allow for positioning in locations otherwise deemed unsuitable, etc.).

As an example of computer equipment, consider the LENOVO® ThinkStation® S20 and D20 computers (Lenovo, Morrisville, N.C.), which have a "mid-tower" and "tower" chassis form factor, respectively. The S20 computer has height, width and length dimensions of 426 mm×175 mm×483 mm while the D20 computer has height, width and length dimensions of 434 mm×210 mm×602 mm. As to mass, the S20 may be about 15 kg while the D20 may be about 25 kg. The S20 and the D20 computers can include a handle mounted at a front end of a top side, for example, which may be removable. Such a handle may help to ensure grip when carrying, considering mass may be about 15 kg or possibly more. As to some other examples, consider the LENOVO® S30, D30, E31, etc., computers marketed by Lenovo. As described in various examples, one or more pads may be attached to a computer (e.g., to a base of a computer housing, etc.), for example, to facilitate positioning of a computer. Such a computer (e.g., optionally a server computer) may be a computer marketed by Lenovo or other entity. As described herein, computer equipment, which can include computers as well as, for example, storage devices, etc., may include one or more pads to facilitate positioning. Such computer equipment may, for example, be configured with a tower or mid-tower chassis form factor.

As an example, consider a scenario with a computer such as the S20 computer including four feet with non-slip characteristics. For such a computer, the four feet with non-slip characteristics make sliding difficult. During set-up, such tower computers may be initially positioned in front of a work desk to allow for installation of cables, etc. Various testing may occur, for example, of components/features, to ensure that they are working properly. After set-up is complete, the computer may be positioned under a work desk. As to positioning, the four feet have very high static and kinetic COFs, which make sliding of the computer along a surface difficult (e.g., to position it under a work desk). While the S20 and the D20 computers are mentioned, these are provided as examples, as other computers (e.g., tower or other form factors) or other computer equipment may experience such friction-related issues.

As described herein, as an example, one or more pads may be attached to computer equipment to facilitate sliding of the computer equipment on a surface. FIG. 1 shows an example of computer equipment 110, which includes two pads 140-1 and 140-2 that facilitate sliding. In the example of FIG. 1, the computer equipment 110 also includes two feet 180-1 and 180-2, which may be textured (e.g., not smooth). In the example of FIG. 1, the pads 140-1 and 140-2 are located near a back end 114 of the computer equipment 110 while the feet 180-1 and 180-2 are located near a front end 116 of the computer equipment 110, noting that a handle 122 may optionally be mounted at or near the front end 116 of the computer equipment 110. As an example, consider a scenario where the front end 116 of the computer equipment 110 is raised to lift the feet 180-1 and 180-2 off a surface such that the entire mass of the computer equipment 110 rests on the pads 140-1 and 140-2. In such an example, the position of the computer equipment 110 may be controlled using the handle 122, for example, by sliding the pads 140-1 and 140-2 of the computer equipment 110 across a surface. In instances where a handle is not provided, the feet 180-1 and 180-2 may provide for insertion of a finger or fingers between the base 130 and a surface for lifting the front end 116 of the computer equipment 110 to tilt the computer equipment 110 for sliding on the pads 140-1 and 140-2. For example, in FIG. 1, a height "h" is shown, which may be defined at least in part by the feet 180-1 and 180-2 and allow for insertion of a finger or fingers (e.g., about 5 mm or more).

In the example of FIG. 1, the computer equipment 110 includes a top side 112, a lower back edge 113, a lower front edge 115, opposing lateral sides 117 and 119, a front panel 120 and a base 130. In the example of FIG. 1, the base 130 is disposed between the opposing sides 117 and 119 and the lower back edge 113 and the lower front edge 115, which may be edges of the base 130 or edges of one or more other components of the computer equipment 110. In the example of FIG. 1, the computer equipment 110 may be or include a computer housing. Such a computer housing may include various other components. In the example of FIG. 1, the computer equipment 110 may include a power supply 102, a motherboard 103, one or more processors 104, memory 105, a storage device 106 (e.g., a drive such as a hard drive, a solid-state drive, etc.), etc.

As to the pads 140-1 and 140-2, an enlarged side view and top view are shown for such a pad 140 in FIG. 1. The pad 140 includes a lower spherical cap surface 142, an upper surface 144 and an edge 146. In the example of FIG. 1, the lower spherical cap surface 142 includes a peak 145 as well as a stem 148. The pad 140 may include an axis of rotation (see, e.g., z-axis). In the example of FIG. 1, the peak 145 and the stem 148 are aligned along an axis. As another example, consider a pad that includes a flat portion surrounded by a spherical cap surface. In such an example, the flat portion may be sized to correspond with a tilt angle (see, e.g., angle $\phi$) such that upon tiling of computer equipment, the spherical cap surface contacts a surface that supports the computer equipment.

In the example of FIG. 1, the pad 140 includes a pad height $h_P$ and a pad radius $r_P$. As an example, the pad height may be about 6 mm while the pad radius may be about 15 mm. As to the feet 180-1 and 180-2, each of these may have a foot height of about the same as that of a pad (e.g., to provide for a level base). In the example of FIG. 1, the stem 148 may include a stem diameter of about 8 mm. Such a stem may provide for locating a pad with respect to a base.

As an example, a computer housing can include a front end and a back end; a back edge; opposing lateral sides; a top side; a base disposed between the front end and the back end and between the opposing lateral sides; and two spherical cap pads attached to the base that define, with respect to the back edge, a maximum tilt angle for downward movement of the back end responsive to upward movement of the front end of the computer housing. For example, referring to FIG. 1, the back edge may be the lower back edge 113 where a maximum tilt angle exists for tilting of the computer equipment 110 (e.g., by raising the front end 116) based, at least in part, on the location and shape of the pads 140-1 and 140-2.

Figure 2:
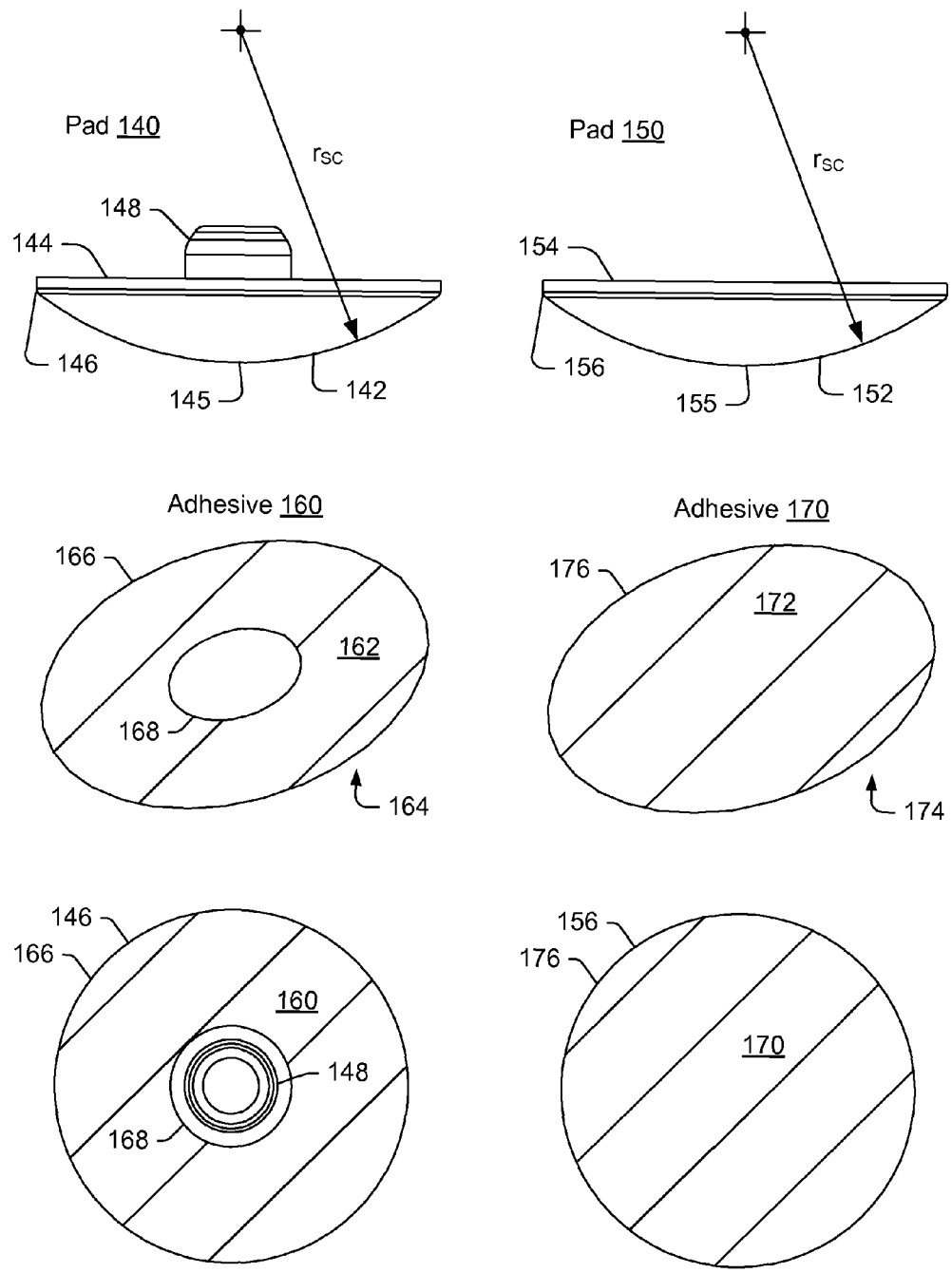
FIG. 2 is a series of views of examples of pads and adhesive.

FIG. 2 shows various views of the pad 140 as including the stem 148 and an example of a pad 150 that does not include such a stem. FIG. 2 also shows adhesive 160 and adhesive 170, which may be used in conjunction with the pads 140 and 150, respectively. The pad 150 includes a lower spherical cap surface 152, an upper surface 154, a peak 155 and an edge 156.

In the examples of FIG. 2, the pads 140 and 150 are shown with respect to a spherical cap radius $r_{SC}$. A spherical cap may be defined, for example, as the region of a sphere which lies above (or below) a given plane. If the plane passes through the center of the sphere, the cap may be called a hemisphere, and if the cap is cut by a second plane, the spherical frustum is called a spherical segment. Surface area of a spherical cap may be approximated by $2\pi * r_{SC} * h_{SC}$. As described herein, for a pad that includes a spherical cap portion (e.g., a spherical cap pad, etc.), that portion may be approximated by (e.g., defined at least in part by) a radius or radii.

As to the adhesive 160, it includes opposing surfaces 162 and 164, an edge 166 and an aperture 168. As indicated, the aperture 168 may receive the stem 148 of the pad 140 to position the adhesive 160 with respect to the upper surface 144 of the pad 140. The adhesive 160 may include adhesive material on both of its sides 162 and 164 for adhering the pad 140 to a base (see, e.g., the base 130 of FIG. 1). As an example, the adhesive 160 may be a layer of adhesive disposed between two removable liners.

As to the adhesive 170, it includes opposing surfaces 172 and 174, and an edge 176. The adhesive 170 may include adhesive material on both of its sides 172 and 174 for adhering the pad 150 to a base (see, e.g., the base 130 of FIG. 1). As an example, the adhesive 170 may be a layer of adhesive disposed between two removable liners.

While various examples include adhesive, a pad may attach via an attachment mechanism such as, for example, a screw, a bolt, a press-fit, a biasing mechanism, a latch or latches, etc. As an example, a pad may attach via one or more attachment mechanisms, optionally including adhesive.

Figure 3:
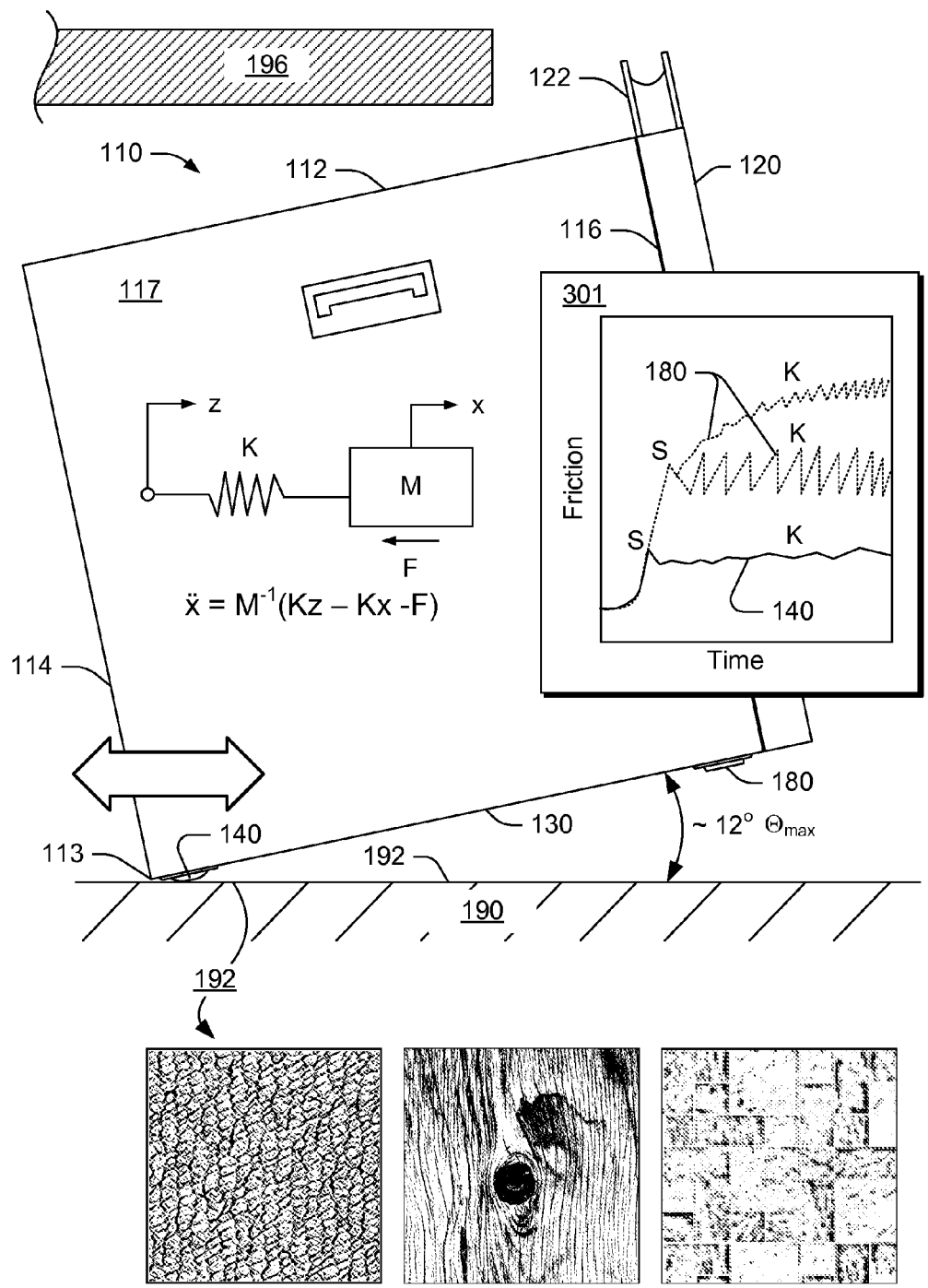
FIG. 3 is a side view of an example of computer equipment and an example of a plot of friction with respect to time for movement of the computer equipment on a surface.

FIG. 3 shows an example of the computer equipment 110 with respect to a surface 190 and an obstacle 196 along with a plot 301 of approximate representations of friction versus time for movement of the computer equipment 110 on the surface 190.

In the example of FIG. 3, a single degree of freedom model may represent various aspects of friction and velocity. In the model, M is the mass of the computer equipment, K is an elastic member stiffness, F is the friction and z is the displacement (e.g., applied to the computer equipment). Such a model may help assess transition from static to kinetic friction as well as a resulting velocity of the computer equipment on the surface as well as stability of sliding behavior. Where force applied to an object is stored as potential energy prior to movement of the object on a surface, a gradual release of the potential energy provides for a more smooth transition from static to kinetic (e.g., in contrast to a sudden release). As an example, where one or more pads provide for gradual release of potential energy, computer equipment may be more navigable (e.g., slidable) on a surface.

Referring to the plot 301, as examples, the feet 180 may produce one of the two upper friction versus time profiles whereas, as an example, the pads 140 may produce a friction versus time profile such as the lower profile. In the plot 301, the pads 140 provide for a lower transition from static-to-kinetic, which may provide for easy and smooth sliding of computer equipment over a surface. FIG. 3 also includes some examples of surface characteristics 192 for the surface 190. For example, a surface may be a carpet surface, a wood surface, a stone surface, etc.

As to a tilt angle, in the example of FIG. 3, a tilt angle of about 12 degrees is shown, which may be defined, at least in part, by the position of the pad 140 with respect to the back edge 113. For example, a person may grab the computer equipment 110 using the handle 122 to tilt it (e.g., up to an angle of about 12 degrees) and then to apply force to slide it along the surface 190 (e.g., to locate the computer equipment 110 beneath the obstacle 196. In the example of FIG. 3, the computer equipment 110 may have a maximum tilt angle $\Theta_{max}$ (e.g., defined at least in part by one or more pads and a back edge).

Figure 4:
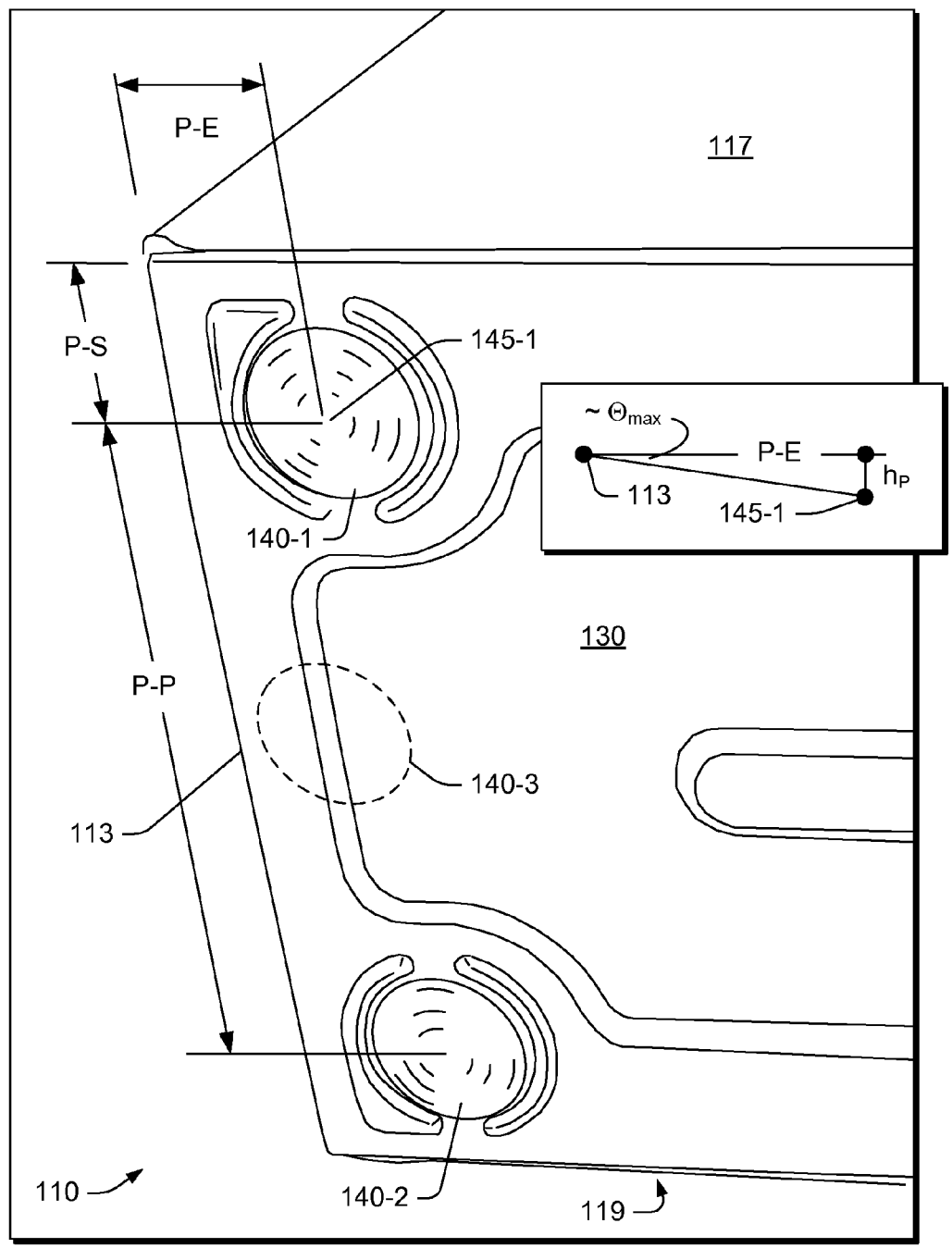
FIG. 4 is a perspective view of an example of a base of computer equipment.

FIG. 4 shows a perspective view of the computer equipment 110 along with examples of various dimensions, including a pad-to-pad dimension (P-P), a pad-to-side dimension (P-S) and a pad-to-edge dimension (P-E) with respect to the pads 140-1 and 140-2 as attached to the base 130 of the computer equipment 110. The dimension P-S is shown for the pad 140-1 with respect to the lateral side 117 and the dimension P-E is shown for the pad 140-1 with respect to the lower back edge 113. The dimension P-S may be approximately the same for the pad 140-2 with respect to the lateral side 119 and the dimension P-E may be approximately the same for the pad 140-2 with respect to the lower back edge 113.

In the example of FIG. 4, the dimension P-E may define, at least in part, a tilt angle for the computer equipment 110. For example, a triangle may be formed using a point on the back edge 113 and points determined by the height of the pad 140-1 at its peak 145-1. As shown in FIG. 4, as an example, a small interior angle of the triangle may approximate a maximum tilt angle $\Theta_{max}$.

FIG. 4 also shows a dashed line that represents an optional pad 140-3 or optional pad location (e.g., for a sole pad on a base or one of multiple pads on a base). For example, where the pad 140-3 is a sole pad, it may determine tilt angle, however, in a tripod arrangement (e.g., with two front end feet), it may also allow for some lateral sway of computer equipment during sliding movement; noting that with a multiple pad arrangement (e.g., with two back end pads), computer equipment may be relatively steady during sliding movement (e.g., little to no lateral sway).

Figure 5:
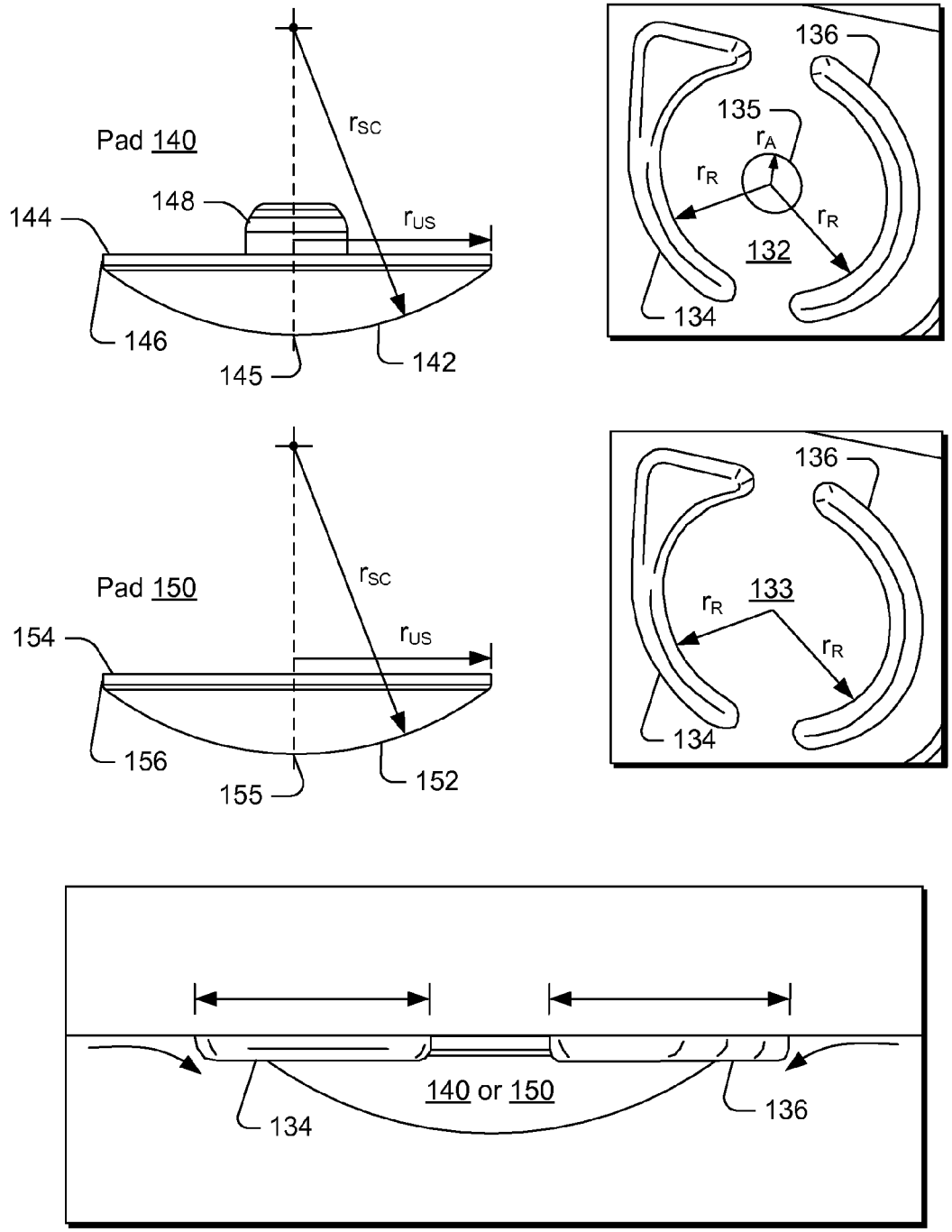
FIG. 5 is a series of views of examples of pads and base surfaces.

FIG. 5 shows various views of the pad 140 and the pad 150 along with some examples of ridges 134 and 136 with respect to examples of surfaces 132 and 133 (e.g., of a base such as the base 130). The pad 140 includes an upper surface radius $r_{US}$, which may be an annular surface about the stem 148. For such a pad, a base can include the surface 132 with an aperture 135 (see, e.g., radius $r_A$) for receipt of the stem 148 where one or more ridges at least partially border the surface 132, which is an annular surface due to the aperture 135 (e.g., defining an inner border of the surface 132). As shown in FIG. 5, the surface 132 includes an outer border defined at least in part by the ridge 134 and the ridge 136, each positioned at a radial distance $r_R$ from a center of the aperture 135.

The pad 150 includes an upper surface radius $r_{US}$, which may be a circular surface. For such a pad, a base can include the surface 133 where one or more ridges at least partially border the surface 133. As shown in FIG. 5, the surface 133 includes an outer border defined at least in part by the ridge 134 and the ridge 136, each positioned at a radial distance $r_R$ from a center of the surface 133.

In the examples of FIG. 5, the radius of an upper surface (e.g., $r_{US}$) of a pad may be approximately equal to a radius associated with a pad attachment surface, for example, as defined by one or more ridges (e.g., $r_R$).

In a side view, the ridges 134 and 136 are shown as extending outwardly past the edge 146 of the pad 140 or the edge 156 of the pad 150. Such ridges may protect an edge of a pad upon sliding of computer equipment on the pad. For example, where a wood floor includes a nail head extending outwardly therefrom, a ridge may direct the nail head away from the edge of a pad where it could potentially lodge between an upper surface of the pad and a surface of a base. As sliding movement of computer equipment may be primarily in a direction along a length of the computer equipment (e.g., from front to back or back to front), an arrangement of a ridge or ridges on a base of the equipment may optionally expose an edge of a pad at a side or sides (e.g., laterally).

As an example, where a base is constructed of sheet metal, a ridge or ridges may act to increase strength about a surface for attachment of a pad. For example, the ridges 134 and 136 of FIG. 5 may be stamped ridges in a sheet metal base that act to strengthen the base about the surfaces for pad attachment. As another example, consider another type of material, which may provide adequate properties to support computer equipment (e.g., a polymer or composite material). In such an example, a ridge or ridges may act to increase strength about a pad attachment region. As yet another example, consider a formed base that includes one or more integral pads (e.g., a polymer or composite material that includes one or more formed pads, each with a smooth surface such as a spherical cap surface). In such an example, openings or mounts may optionally be provided for feet (e.g., front end feet).

As an example, consider a computer with a mass of about 15 kg or more. When such a computer is tilted to rest solely on two pads, each pad may experience force due to the mass as well as any force applied to slide. Where the computer is being slid on a tile floor with undulations or grout gaps, the base may experience stress where the pads attach; one or more ridges may strengthen the base to thereby help avoid deformation of the base. Thus, as an example, one or more ridges may act to strengthen a base as well as to avoid an object from catching or lodging between an upper surface of a pad and a base attachment surface for the pad.

As described herein, a pad may include a radius that is approximately equal to a radius of a ridge on a base to ensure that a gap, should one exist, is relatively small and unlikely to catch an object such as a nail. Referring again to FIG. 1, for the feet 180-1 and 180-2, while ridges exist about each of the feet, the radius of each foot provides for a gap between the ridges and the edge of the foot. In the example of FIG. 1, the foot-ridge gap is larger than any pad-ridge gap. Thus, an object is less likely to catch on one of the pads 140-1 and 140-2 for front-to-back or back-to-front sliding compared to one of the feet 180-1 and 180-2 (e.g., if the computer equipment 110 was being slid on its feet 180-1 and 180-2). As an example, in instances where sliding on the feet 180-1 and 180-2 does not or is unlikely to occur, presence of a gap or gaps of a particular width between a foot and a ridge may be tolerable.

Figure 6:
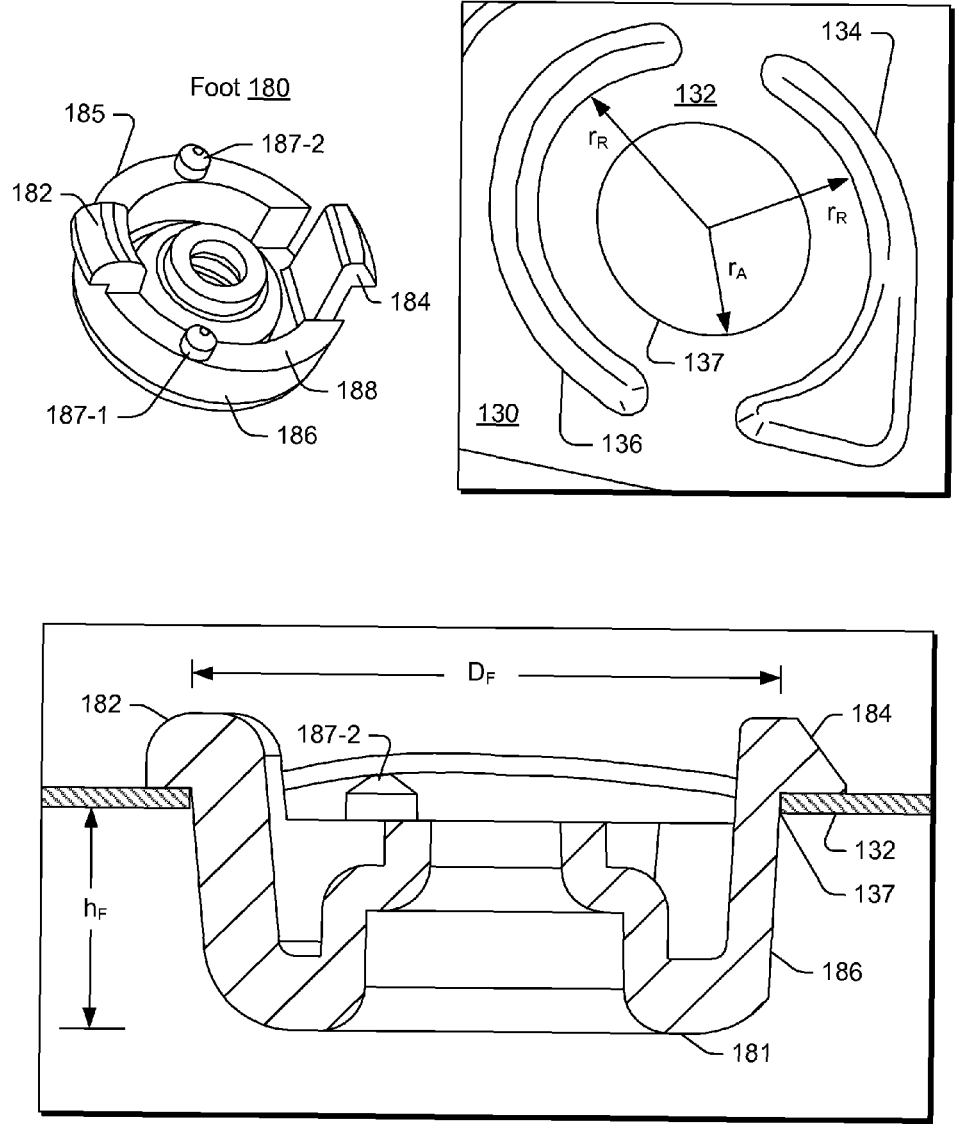
FIG. 6 is a series of views of an example of a foot and a base surface.

FIG. 6 shows a perspective view and a cross-sectional view of an example of one of the feet 180-1 and 180-2, as a foot 180 along with a perspective view of a portion of a base 130. The foot 180 includes an annular surface 181, a hook 182, a prong 184, an edge 185, a substantially cylindrical surface 186 (e.g., which may be tapered), knobs 187-1 and 187-2, and a lower surface 188. As shown, the foot 180 includes a foot diameter $D_F$, which may be defined by lower edge 185. As an example, a foot may include a foot diameter of about 20 mm (e.g., a foot radius of about 10 mm).

In FIG. 6, the base 130 includes a surface 132, ridges 134 and 136 and an aperture 137 having a radius $r_A$, which is sufficiently large to receive the hook 182 and the prong 184 of the foot 180. In the cross-sectional view, the annular surface 181 is shown as being available for supporting the base 130 on a surface. As to installation, the hook 182 may be inserted into the aperture 137 and then the foot 180 may be rotated to pass a locking end of the prong 184 into the aperture 137. As shown, the knobs 187-1 and 187-2 provide support against the surface 132 of the base 130. In an installed configuration, the clip 184 may be biased inwardly toward the interior of the substantially cylindrical foot 180.

The foot 180 may a rubber foot, have a rubber surface, have a textured surface, etc. As an example, the foot 180 may be constructed from a material such as ABS or polycarbonate and it may have, for example, a SPI B-3 surface finish.

A finish value can be a relationship between an initial finish (e.g., machined surface) and a desired final finish. For example, a machined surface may be manually polished to a specified SPI/SPE finished surface. As a start finish becomes coarse and/or a polish finish becomes finer, a SPI value may increase. For example, it may take one hour to polish one square inch of an EDM finish to a B2 (400 paper) finish and it may take two hours to polish one square inch of an EDM finish to an A3 (15 diamond) finish.

As an example, a foot may be finished with a texture and a pad may be finished to be smooth (e.g., "no texture") and thereby have one or more COFs that are less than that of the foot. As an example, a foot may be constructed from ABS or polycarbonate and a pad may be constructed from ABS or polycarbonate. In such an example, the finish of the foot and the finish of the pad may differ where the pad has a finer finish, for example, that results in one or more COFs that are less than that of the foot.

Figure 7:
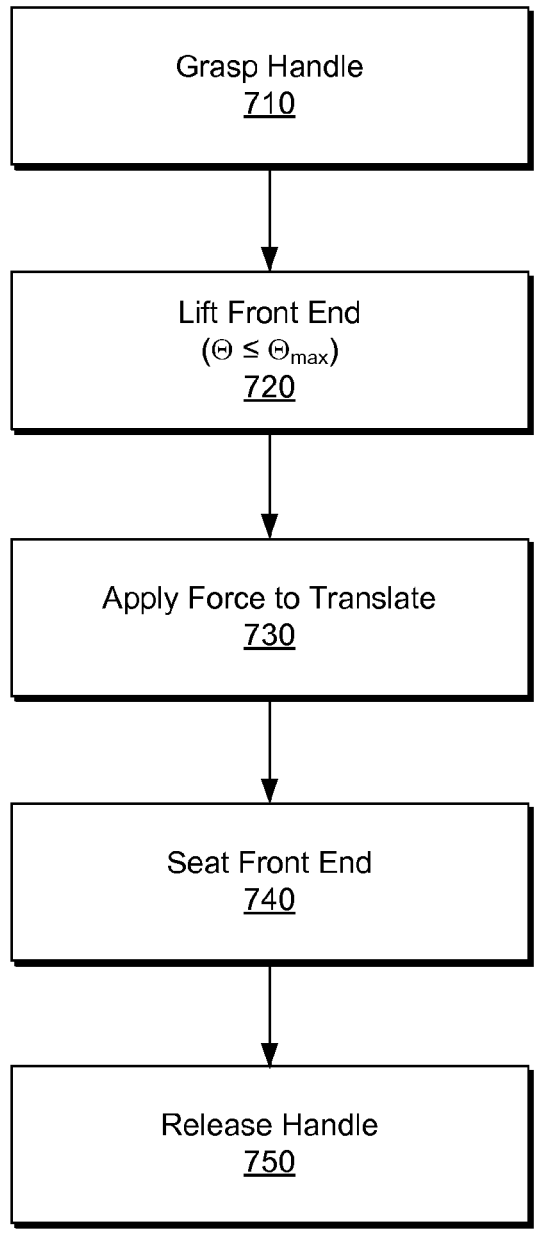
FIG. 7 is a block diagram of an example of a method.

FIG. 7 shows an example of a method 700. The method 700 includes grasping a handle of computer equipment 710, lifting the front end of the computer equipment 720 (e.g., to an angle less than a maximum tilt angle), applying force to translate the computer equipment 730, seating the front end of the computer equipment 740 and releasing the handle of the computer equipment 750.

Figure 8:
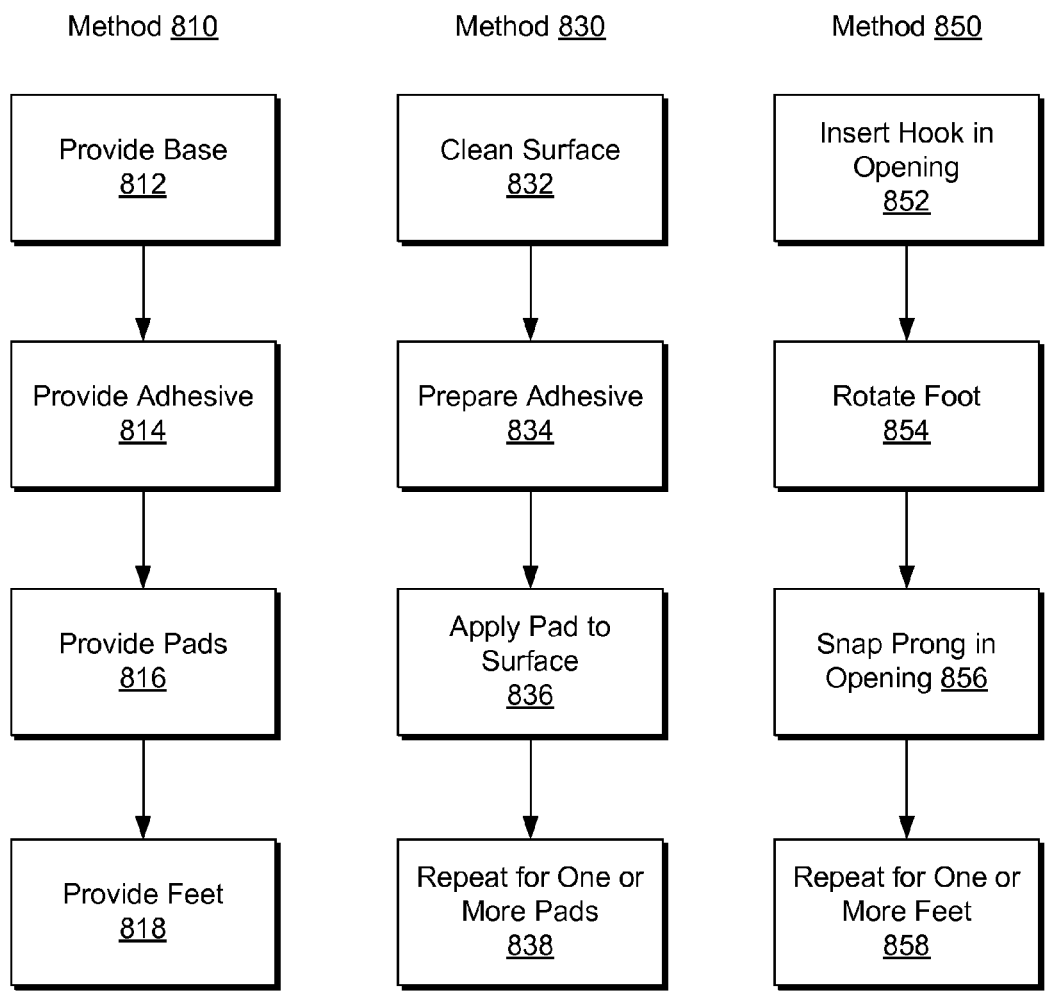
FIG. 8 is a block diagram of an example of a method.

FIG. 8 shows examples of methods 810, 830 and 850. As shown, the method 810 includes providing a base 812, providing adhesive 814, providing pads 816 and providing feet 818. As shown, the method 830 includes cleaning a surface 832, preparing adhesive 834, applying a pad to a surface 836, and repeating the cleaning 832, the preparing 834 and the applying 836 for one or more other pads 838. As shown, the method 830 includes inserting a hook in an opening 852, rotating the foot 854, snapping a prong of the foot into an opening 856, and repeating the inserting 852, the rotating 854, and the snapping 856 for one or more other feet 858.

To provide for appropriate bond strength of adhesive, a surface may be cleaned and dried. As to cleaning, a solvent such as heptane or isopropyl alcohol may be applied to the surface. Bond strength may also be improved with firm application pressure and moderate heat, for example, from about 38° C. to about 54° C., which may cause the adhesive to develop intimate contact with the bonding surface.

As to types of adhesive, as an example, an acrylic adhesive may be used (e.g., a laminating adhesive such as the adhesive 9472LE, marketed by 3M, Saint Paul, Minn.). As an example, an adhesive may be provided with a liner or liners (e.g., as adhesive disposed between two liners). As an example, an adhesive may be prepared by removing one or more liners or covering material. As an example, adhesive may be "two-sided", optionally with an adhesive supporting material disposed between layers of adhesive.

As an example, a computer housing can include a front end and a back end; a back edge; opposing lateral sides; a top side; a base disposed between the front end and the back end and between the opposing lateral sides; and two spherical cap pads attached to the base that define, with respect to the back edge, a maximum tilt angle for downward movement of the back end responsive to upward movement of the front end of the computer housing. In such an example, the computer housing may further include two cylindrical feet attached to the base that define, at least in part, a base clearance height (see, e.g., height "h" of FIG. 1). As an example, the two cylindrical feet may have a coefficient of friction that exceeds a coefficient of friction of the two spherical cap pads. As an example, a spherical cap pad can include a smooth spherical cap surface.

As an example, a computer housing can include two spherical cap pads that include surface properties that provide for static and kinetic coefficients of friction less than static and kinetic coefficients of friction of two cylindrical feet attached to the computer housing. As an example, a computer housing can include two spherical cap pads where each includes a sliding surface having a finer SPI finish than a supporting surface of each of the two cylindrical feet attached to the computer housing.

As an example, a spherical cap pad can include a spherical cap surface defined at least in part by a radius. In such an example, a computer equipment base can include a ridge defined at least in part by a radius where the radius ridge may exceed the radius that defines, at least in part, the spherical cap surface of the spherical cap pad.

As an example, a computer housing can include two spherical cap pads where each of the pads includes a perimeter defined at least in part by a radius and where a base of the computer housing includes a ridge defined at least in part by a radius that exceeds the radius of the perimeter of a respective pad.

As an example, a computer housing may include a base where adhesive is disposed at least partially between each of two spherical cap pads and the base. In such an example, the base may include two cylindrical feet, each attached to the base via a biasing mechanism (e.g., a hook and a prong, etc.).

As an example, a computer housing can include a top side handle. Such a handle may provide for tiling of the computer housing. Where the computer housing is positioned on a surface, the tilting may be limited by contact of a back edge of the computer housing with the surface. In such an instance, where further tilting occurs, the mass of the computer housing may be substantially supported by the back edge and, for example, upon movement of the computer housing, the back edge may scratch the surface, the surface may deform the back edge, etc. For angles less than the contact angle (e.g., less than a maximum tilt angle), the computer housing may be supported on one or more pads. For example, such a pad may include a spherical cap surface or a portion of a spherical cap surface that provides for sliding of the computer housing on the surface (e.g., by pulling or pushing using, for example, the handle). As an example, a computer housing may include computer components and may have a mass of approximately 30 kg or less.

As an example, a computer can include one or more processors; memory; a storage device; a power supply; a handle; a base; and at least two pads mounted to the base where each of the pads includes, at least in part, a spherical cap surface having a smooth finish that provides for substantially constant kinetic friction with respect to time for translation of the computer responsive to force applied to the handle. As to substantially constant kinetic friction, a plot of friction versus time for a relatively flat surface may fail to exhibit a sawtooth pattern characteristic of stick-slip behavior.

As an example, a computer can include at least one of at least two pads that defines a maximum tilt angle for the computer with respect to a supporting surface for the computer. As an example, a computer may include two pads.

As an example, a computer may include pads and feet where each of the feet includes, at least in part, an annular surface having an SPI B3 finish. In such an example, the pads can include a smooth finish that is a smoother or finer finish than that of a respective annular surface of each of the feet.

As an example, a method can include providing a base for a computer housing; providing adhesive; providing pads where each of the pads includes, at least in part, a spherical cap surface; providing feet where each of the feet includes, at least in part, an annular surface; adhering the pads to the base (e.g., using the adhesive); and snap fitting the feet to the base. In such a method, the adhering can position the pads near a back end of the base and the snap fitting can position the feet near a front end of the base.

Although some exemplary methods, devices, systems, arrangements, etc., have been illustrated in the accompanying Drawings and described in the foregoing Detailed Description, it will be understood that these examples as disclosed are not limiting, but are capable of numerous rearrangements, modifications and substitutions without departing from the spirit set forth and defined by the following claims.

The invention claimed is:

1. A computer housing comprising:
   a front end and a back end;
   a back edge;
   opposing lateral sides;
   a top side;
   a base disposed between the front end and the back end and between the opposing lateral sides;
   a foot attached to the base; and
   two slippery spherical cap pads attached to the base that define, with respect to the back edge, a maximum tilt angle for downward movement of the back end responsive to upward movement of the front end of the computer housing wherein the two slippery spherical cap pads are located closer to the back end than the foot and wherein, relative to a supporting surface for the foot and the two slippery spherical cap pads, the foot comprises a coefficient of friction that exceeds a coefficient of friction of the two slippery spherical cap pads.

2. The computer housing of claim 1 wherein the foot comprises a cylindrical foot and comprising another cylindrical foot wherein the two cylindrical feet attached to the base that define, at least in part, a base clearance height.

3. The computer housing of claim 1 wherein each of the two slippery spherical cap pads comprises a smooth spherical cap surface.

4. The computer housing of claim 2 wherein both of the two cylindrical feet comprise a coefficient of friction that exceeds the coefficient of friction of the two slippery spherical cap pads.

5. The computer housing of claim 2 wherein the two slippery spherical cap pads comprise surface properties that provide for static and kinetic coefficients of friction less than static and kinetic coefficients of friction of the two cylindrical feet.

6. The computer housing of claim 2 wherein each of the two slippery spherical cap pads comprises a sliding surface having a finer SPI finish than a supporting surface of each of the two cylindrical feet.

7. The computer housing of claim 1 wherein each of the slippery spherical cap pads comprises a spherical cap surface defined at least in part by a radius.

8. The computer housing of claim 1 wherein the base comprises a ridge defined at least in part by a radius.

9. The computer housing of claim 1 wherein the base comprises a ridge defined at least in part by a radius and wherein the radius of the ridge exceeds a radius that defines a spherical cap surface of a respective one of the slippery spherical cap pads.

10. The computer housing of claim 1 wherein each of the slippery spherical cap pads comprises a perimeter defined at least in part by a radius and wherein the base comprises a ridge defined at least in part by a radius that exceeds the radius of the perimeter.

11. The computer housing of claim 1 further comprising adhesive disposed at least partially between each of the two slippery spherical cap pads and the base.

12. The computer housing of claim 2 wherein each of the cylindrical feet comprises a biasing mechanism for attachment to the base.

13. The computer housing of claim 1 further comprising a top side handle.

14. The computer housing of claim 1 further comprising computer components and a mass less than approximately 30 kg.

15. A computer comprising:
   one or more processors;
   memory;
   a storage device;
   a power supply;
   a handle;
   a base; and
   at least two pads mounted to the base wherein each of the pads comprises, at least in part, a spherical cap surface having a smooth finish that provides for substantially constant kinetic friction with respect to time for translation of the computer responsive to force applied to the handle.

16. The computer of claim 15 wherein at least one of the at least two pads defines a maximum tilt angle for the computer with respect to a supporting surface for the computer.

17. The computer of claim 15 comprising two pads.

18. The computer of claim 15 comprising feet wherein each of the feet comprises, at least in part, an annular surface having an SPI B3 finish and wherein the smooth finish of the at least two pads comprises a smoother finish.

19. A method comprising:
providing a base for a computer housing;
providing adhesive;
providing pads wherein each of the pads comprises, at least in part, a spherical cap surface;
providing feet wherein each of the feet comprises, at least in part, an annular surface;
adhering the pads to the base using the adhesive; and
snap fitting the feet to the base
wherein the adhering positions the pads near a back end of the base and the snap fitting positions the feet near a front end of the base.

\* \* \* \* \*